US008352621B2

(12) United States Patent
Di Balsamo et al.

(10) Patent No.: US 8,352,621 B2
(45) Date of Patent: Jan. 8, 2013

(54) METHOD AND SYSTEM TO AUTOMATICALLY OPTIMIZE EXECUTION OF JOBS WHEN DISPATCHING THEM OVER A NETWORK OF COMPUTERS

(75) Inventors: Arcangelo Di Balsamo, Rome (IT); Giorgia Iarussi, Rome (IT); Francesca L. Pasceri, Rome (IT)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 12/968,376

(22) Filed: Dec. 15, 2010

(65) Prior Publication Data

US 2011/0154358 A1 Jun. 23, 2011

(30) Foreign Application Priority Data

Dec. 17, 2009 (EP) .................................... 09179663

(51) Int. Cl.
*G06F 15/16* (2006.01)
(52) U.S. Cl. ......... 709/229; 709/224; 709/226; 709/227
(58) Field of Classification Search .................. 709/229, 709/224, 226, 227, 208; 712/28; 718/105, 718/101, 104, 1

See application file for complete search history.

(56) References Cited

U.S. PATENT DOCUMENTS

| 7,302,450 | B2 | 11/2007 | Benedetti et al. |
| 2003/0005068 | A1* | 1/2003 | Nickel et al. ................... 709/208 |
| 2003/0154284 | A1* | 8/2003 | Bernardin et al. ............ 709/226 |
| 2007/0271570 | A1* | 11/2007 | Brown et al. .................. 718/105 |
| 2008/0301405 | A1* | 12/2008 | Kaufman et al. ................ 712/28 |
| 2009/0265710 | A1* | 10/2009 | Shen et al. ..................... 718/101 |
| 2009/0271784 | A1* | 10/2009 | Barsness et al. .................. 718/1 |
| 2011/0061057 | A1* | 3/2011 | Harris et al. ................... 718/104 |
| 2011/0145392 | A1* | 6/2011 | Dawson et al. ............... 709/224 |

\* cited by examiner

*Primary Examiner* — Le H Luu
(74) *Attorney, Agent, or Firm* — Law Office of Jim Boice (57) ABSTRACT

A computer implemented method, system, and/or computer program product selects a target computer to execute a job. For each computer in a system, a statistical mean of last job duration values is computed from historical records for all computers that have executed the job. Multiple pools of computers are selected based on a statistical mean of last job duration values. A ratio for each pool from the multiple pools is computed. This ratio is a ratio of the quantity of current executions of the job in a particular pool compared to a total of current job executions of the job in all of the multiple pools of computers. A particular pool of computers, which has a computed ratio that is closest to a preselected ratio, is selected. A target computer is selected from the particular pool of computers to execute a next iteration of the job.

15 Claims, 6 Drawing Sheets

| Elapsed Time | Number of computers |
| --- | --- |
| 1 sec | 3 |
| 3 sec | 5 |
| 8 sec | 14 |
| 10 sec | 20 |
| .... | ..... |

| Elapsed Time | Number of computers |
|---|---|
| 1 sec | 22 |
| 3 sec | 15 |
| 8 sec | 5 |
| .... | .... |
| .... | ..... |

METHOD AND SYSTEM TO AUTOMATICALLY OPTIMIZE EXECUTION OF JOBS WHEN DISPATCHING THEM OVER A NETWORK OF COMPUTERS

CROSS-REFERENCE TO RELATED APPLICATIONS

The present application claims a priority filing date of Dec. 17, 2009 from EP Patent Application No. 09179663.1, which is incorporated herein in its entirety by reference.

BACKGROUND

The present invention generally relates to job scheduling. More particularly, the present invention is directed to automatically optimizing execution time of jobs when dispatching them over a network of computers.

Workload schedulers schedule job streams (workflows) on local or remote networks of computers. Job scheduling refers to the scheduling of jobs, including either batch jobs, interactive tasks, or any job for which the execution can be scheduled. In order to reach predefined performance targets (defined for instance, in a Service Level Agreement with a customer for whom the job execution service is provided), the performance of job execution, the job duration time, must be carefully monitored and optimized. Consequently, there is a need to optimize the use of computers in the network when dispatching the job for execution.

The usual way to optimize scheduling of jobs consists of preparing a scheduling plan according to the resources to be used by each job and the constraints in terms of execution software environment and machine resources. The association between workflows and computers is usually static. It may be necessary, however, to have a dynamic capability of adapting load over a set of computers, by re-adapting the load to the available computers at execution time for instance. Simple dispatching of jobs on distributed computers can be done according to a policy, such as sending the job on the computer having the lowest CPU instant utilization or according to a round robin algorithm in order to ensure that the spread workload is equitably dispatched on the computers. However, these algorithms do not permit to take into account all the computer instant situations. U.S. Pat. No. 7,302,450 discloses an efficient way to select a prioritized set of jobs among jobs planned for execution on a computer in order optimize the use of computing resources on this computer. The algorithm used to select the jobs to be executed in priority is based on the knowledge of the list of jobs to be scheduled, the job resource consumption statistics and predefined threshold conditions which depend on the computer resource capacities. This solution provides a sophisticated algorithm for selection of the computers that are to execute the jobs but requires that a lot of information be collected about the jobs and require knowledge of each computer's physical computing resource capacity.

There is accordingly a need to dispatch job for execution on a network of computers in order to minimize job execution time on those computers while avoiding collecting and processing too much information from the computers because this is a waste of computing resources.

BRIEF SUMMARY

A computer implemented method, system, and/or computer program product selects a target computer to execute a job. For each computer in a system, a statistical mean of last job duration values is computed from historical records for all computers that have executed the job. Multiple pools of computers are selected based on a statistical mean of last job duration values. A ratio for each pool from the multiple pools is computed. This ratio is a ratio of the quantity of current executions of the job in a particular pool compared to a total of current job executions of the job in all of the multiple pools of computers. A particular pool of computers, which has a computed ratio that is closest to a preselected ratio, is selected. A target computer is selected from the particular pool of computers to execute a next iteration of the job.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
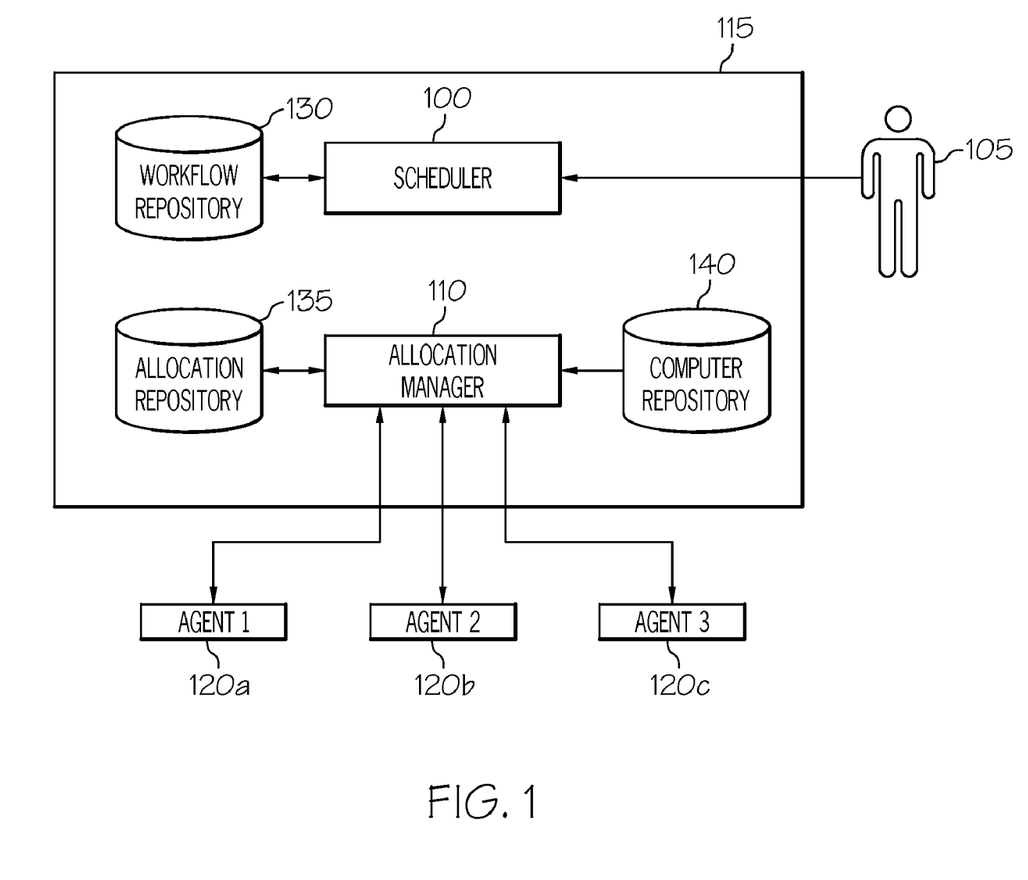
FIG. 1 shows the system environment of one embodiment of the invention.

FIG. 1 shows the system environment of one embodiment of the invention, including components used for workload scheduling in a distributed environment. In one embodiment, the components are implemented as software programs executing on hardware logic. Exemplary hardware logic utilized herein has appropriate hardware (e.g., a processor, input/output interfaces, memory storage devices, system memory, etc.) and supporting software (e.g., operating system). New components are described according to one embodiment of the invention.

The scheduler component 100 which is a server application, receives, as in prior art, a submission of a workflow for instance through an interface used by an operator (105). Another possibility is to have automatic submissions of workflows on the server. The workload scheduler component 100 which controls scheduling of jobs on distributed computers in a network is usually installed on a central server controlling functions installed such as system monitoring. The scheduler uses a workflow repository 130 which contains the workflow definitions provided by the operator. The workflow definitions provide information on each job of the job stream which is necessary for their execution. The workflow definitions, for the need of the present invention, can include a job identifier and the job pre-requisite environment. Note that in one embodiment the pre-requisite is just static, and does not include the necessary computing resources but rather only includes the operating system in which the job is to be executed, the patch level and the programs that are necessary for executing the job. One additional information, the estimated job duration time, is usually computed by the schedulers of prior art using the workflow repository as a historical database. As discussed below, this estimation will be performed by a new component, the Allocation Manager 110, which is the dedicated component that maintains statistical information on job execution.

On each distributed computer, a scheduler client application, agents 120a, 120b, 120c, start the execution of jobs as required by the scheduler 100 which is the server application. The scheduler 100 communicates with the agents 120a-c on each distributed system to ask them to execute designated jobs. The scheduler 100 sends to the agents 120a-c all the information necessary for the job executions. The agents 120a-c also send back to the scheduler 100 report information such as job execution time.

A new scheduler component, the Allocation Manager 110, operating on the server side, is introduced. The principle of the Allocation Manager 110 is to relieve the traditional scheduler from the task of dispatching the jobs to the distributed computers by introducing a component which will use a specific algorithm. The Allocation Manager 110 thus executes the logic to individuate the "best" computer to execute the jobs of the workflow. In one embodiment, the "best" computer for a job is the computer which is able to execute this job in the minimum amount of time. The Allocation Manager 110 keeps track of the computers on which jobs are executed and keeps data of jobs which are executed on these computers. This information is stored by the Allocation Manager 110 in the Allocation Repository 135. In the Allocation Repository 135 the Allocation Manager 110 stores current status of jobs as well as statistical data on jobs executed on all the distributed computers of the network.

Some computer information is stored in a database, the Computer Repository 140, which is populated either manually by an operator 105 or automatically by a computer discovery algorithm. The Computer Repository 140 associates to each computer in the network the computer software capabilities to help check if a computer contains a job pre-requisite environment to allow execution of the job on the computer. The Allocation Manager 110 will consult this database to select the computers suitable for executing the job before applying the algorithm to dispatch a job on the "best" computer.

Figure 9:
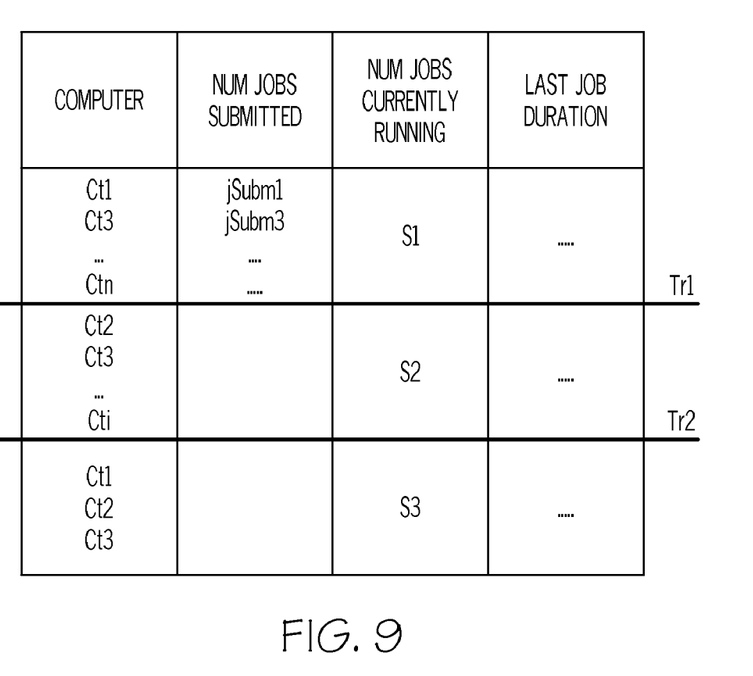
FIG. 9 shows a table as built in memory by the Allocation Manager according to one embodiment.

It is noted that, compared to the data used by the scheduling method as taught by the U.S. Pat. No. 7,302,450 of prior art, the information in the Allocation Repository described below in FIG. 9 is less expansive.

Figure 2:
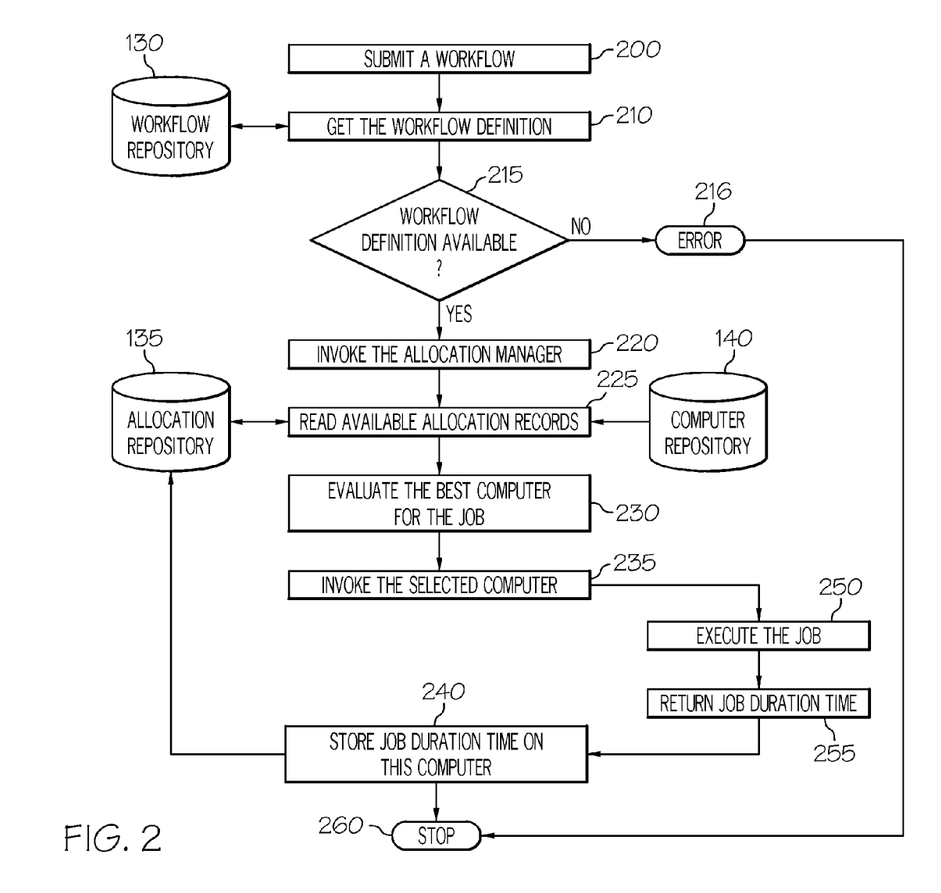
FIG. 2 is a general flowchart for scheduling workflows according to one embodiment of the invention.

FIG. 2 is a general flowchart for scheduling workflows according to one embodiment of the present invention. This flowchart describes the steps for processing a workflow, which is dispatching a stream of jobs for their execution on the distributed computers. The operator, or an automatic triggering event submits a workflow (block 200) to be scheduled by the scheduler. The scheduler gets the workflow definition from the workflow repository 130 (block 210) and if the workflow definition is unavailable (answer "No" to test 215), an error 216 is raised by the scheduler and the process stops (block 260). If the scheduler finds the workflow definition in the workflow repository (answer "Yes" to test 215), the scheduler for each job of the workflow invokes the Allocation Manager (block 220) to assign the best computer for its execution. The scheduler also gives the workflow definition information for this job to the Allocation manager. The split between the functions of the scheduler and the Allocation Manager components is variable. In one embodiment the job execution duration time which is usually handled by the scheduler, is estimated by the Allocation Manager which stores statistical information on job execution on the distributed computers. The Allocation Manager then reads the information in the Allocation Repository 135 and the information from the Computer Repository 140 (block 225) and evaluates the best computer allocation for the job (block 230). This step performed by the Allocation Manager is described later on in the document in reference to the description of the FIGS. 3-10. The Allocation manager invokes the computers selected for execution of the jobs of the workflow (block 235). On the computer, the agent starts execution of the job (block 250) and when the execution is completed, the agent returns to the Allocation Manager the real job duration time measured for the job on the computer on which the job has been executed (block 255). The Allocation Manager stores the job duration time (block 240) and assigns this duration time for this job to the computer on which the job has been executed in the historical database which is the Allocation repository 135, then the process ends (block 260). As seen later on the document in relation with description of FIG. 9, other updates of records of the Allocation repository are performed by the Allocation Manager: the quantity of current executions currently running when execution of the job is started on the chosen computer is incremented by one.

As described in more detail later on in the document in the flowchart of FIG. 10, in order to perform the best computer allocation (230), the Allocation Manager uses only historical data related to the previous execution of jobs similar to the one being allocated. The Allocation Manager identifies computers where a similar job is run before selecting among them the best computer for the shortest job execution. It is noted that the allocation manager uses historical data and does not require specifying the physical characteristics of the computers (CPU speed, memory, I/O rate) neither does it require their monitoring (CPU usage, memory available) during job execution.

One can assume that the time for executing a given category of jobs on a pool of computers having the pre-requisite configuration to execute the jobs follows a normal distribution (Gaussian distribution). The type of distribution curve is not significant for the modeling, since the real distribution may follow a different model (Gaussian, Laplace, Uniform, Lorentian).

Figure 3:
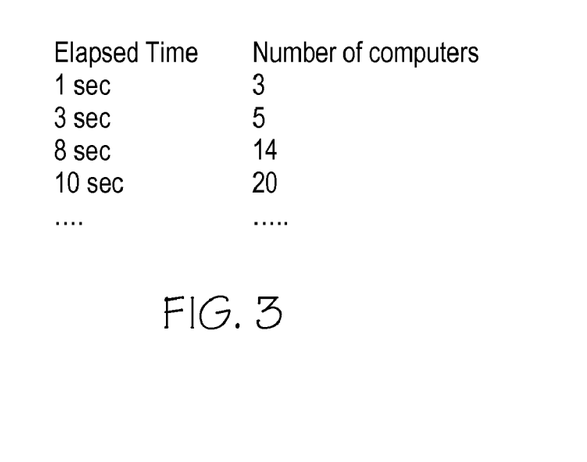
FIGS. 3 and 4 give an example of collection of job duration times and their distribution on the computers.
Figure 4:
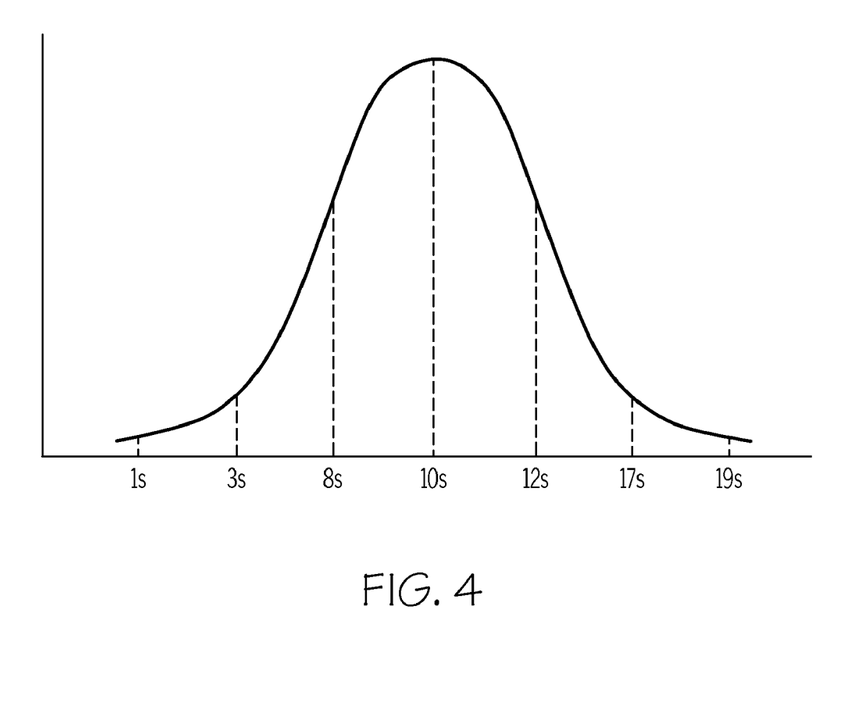

FIGS. 3-4 give an example of collection of job duration time and their distribution on the computers. An example of job execution time distribution could be as shown in FIG. 3: the duration time read from statistical data of the job executing on three computers is 1 second, on five computers is 3 seconds, etc. FIG. 3 is an example of collected job duration time and FIG. 4 shows its distribution Gaussian curve. The job execution time is reported on the X axis and the number of computers on which the job is executed on the Y axis. The majority of computers execute the job in 10 seconds, this is the mean. On the right side of the Gaussian curve the execution time is longer than the mean on these computers and on the left side the execution time is less than the mean.

Figure 5:
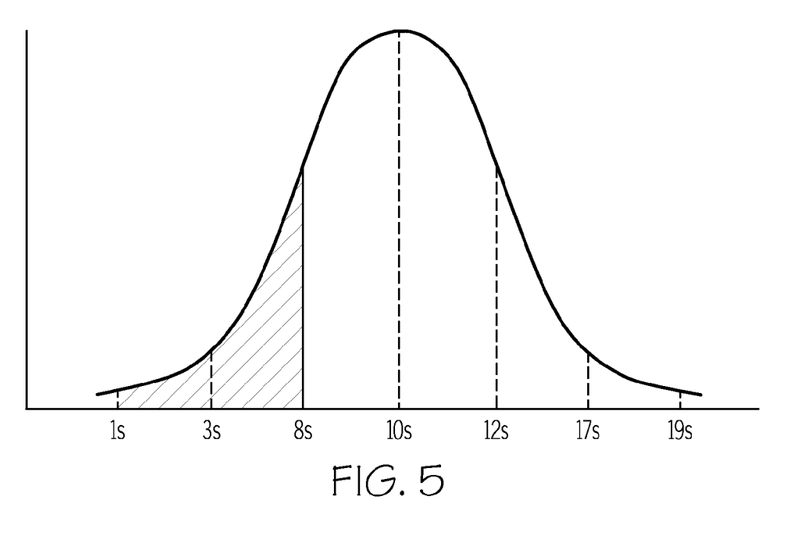
FIGS. 5, 6, and 7 illustrate one example of how the collected job duration times may be used for dispatching jobs to distributed computers using one threshold.
Figure 6:
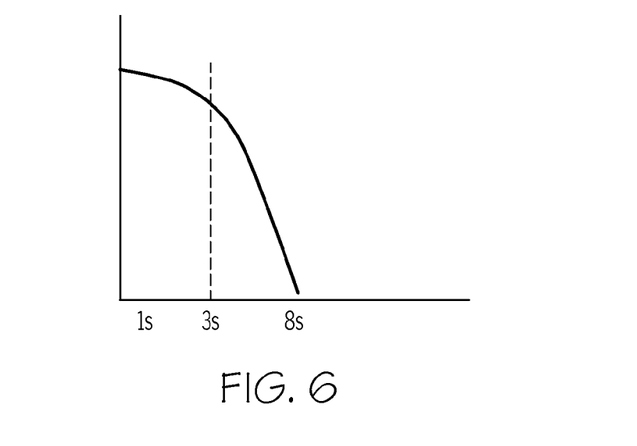
Figure 7:
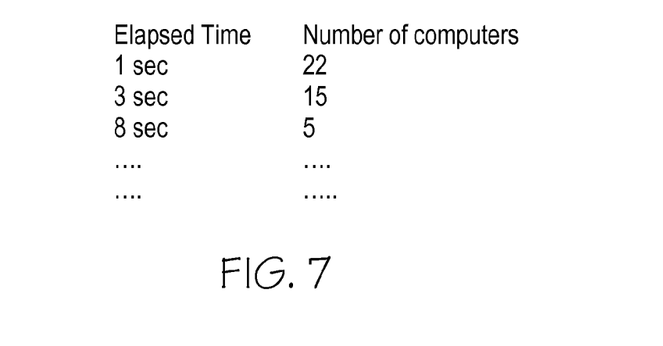

FIGS. 5, 6, and 7 illustrate one example of how the collected job duration time may be used for dispatching jobs to distributed computers using one threshold. The Allocation Manager considers the distribution of the execution time on computers. In one embodiment, thresholds are set which imply a split of the distribution. For instance, as shown in FIG. 5 which represents a Gaussian distribution, one can set a cut-off threshold at 8 seconds. The Allocation Manager will consider only the computers that complete execution of the job before the 8 second threshold because they have the shortest execution time. The job allocations made by the allocation manager could follow the distribution reported in the FIG. 6. This distribution is based on the figures of FIG. 7, which shows 22 computers in which a similar job is executed in 1 second etc. This is the distribution where the dispatching of jobs for execution on the distributed systems may decide to choose the best computers, the computers for which the job duration is the shortest.

Figure 8:
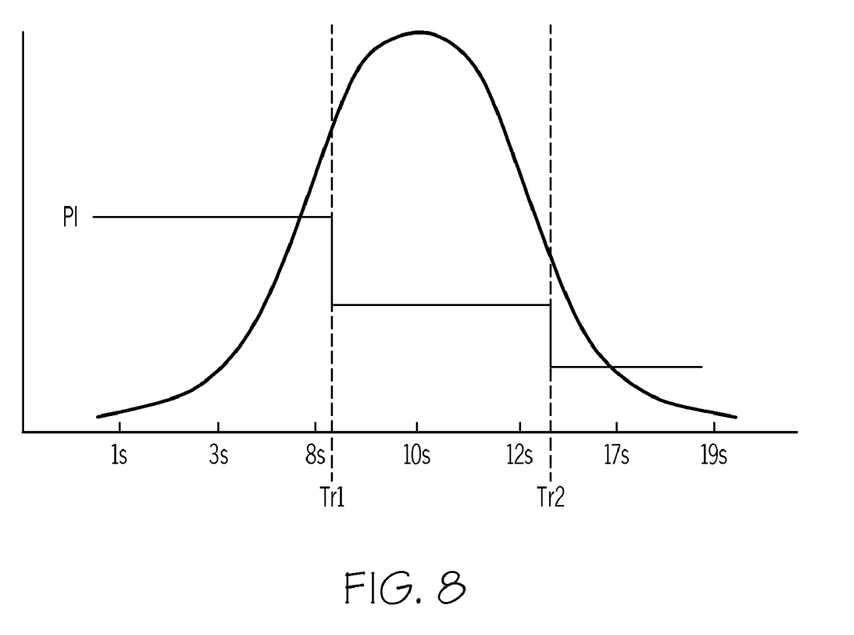
FIG. 8 illustrates a second example of how the collected job duration time may be used for dispatching jobs to distributed computers using two thresholds.

FIG. 8 illustrates a second example of how the collected job duration time may be used for dispatching jobs to distributed computers using two thresholds as the Allocation Manager may do. On a Gaussian curve of the distribution of job duration time on distributed computers, some thresholds (for example Tr1 and Tr2 in FIG. 8) are given to split job duration time among these values. The jobs can be assigned to computers in these three areas while targeting different percentages (Pi in the FIG. 8 figure). For instance, one target could be to have 80% of the jobs executed by computers on which the statistical duration time for the job is under Tr1; 15% of the jobs executed by computers on which the statistical duration time for the job is between Tr1 and Tr2; 5% of the jobs executed by computers on which the statistical duration time for the job is greater than Tr2. Dispatching of jobs on the distributed computer is thus not "uniform", but the algorithm may, as in this example, dispatch most of the jobs on faster computers and fewer and fewer jobs on computers that in the statistical data are slower.

Based on this teaching, to dispatch the job for execution on the distributed systems, the Allocation Manager will use the Allocation Repository to read statistical data of job duration time on the distributed computers. At least one threshold will be given as input to the Allocation Manager for splitting distribution of duration time into different intervals corresponding to pools of distributed computers. Finally, guidance will be also given to the Allocation Manager to target an ideal percentage of jobs duration in each of the computer pools.

The Allocation Repository:

As described above, the Allocation Repository is filled by the Allocation Manager each time a job has been executed on a computer. The Allocation Repository collects information on execution of jobs on each computer. The Allocation Manager accesses the Computer Repository with the list of all the computers of the computer network on which the job may be dispatched for execution. Using this information, the Allocation Manager initially creates one entry in the Allocation Repository for each computer of the network. Then at each job execution on one of these computers, the Allocation Manager stores information in the corresponding computer record. The Allocation Repository record contains a computer identifier, and at least one job identifier for a job. If a job identifier is associated to the computer record, this means that this job has been submitted at least once on this computer.

When the scheduler invokes the Allocation Manager to dispatch a job on one computer for execution, the Allocation Manager reads the Allocation Repository to calculate the best computer for the job. The Allocation Manager also updates the record corresponding to the chosen computer in the Allocation Repository when it sends the job for its execution. The updates consist of adding the job identifier if it was never added before because it is the first execution on this computer and in incrementing by one the number of jobs currently running on the computer. Each duration time of a job is recorded after its execution on the computer. After execution, the last job duration time for the computer and the total job submitted on the computer from time zero also are recorded. FIG. 9 shows a table as built in memory by the Allocation Manager using the Allocation Repository according to one embodiment.

The Allocation Manager first reads the Allocation Repository and the Computer Repository to select in the Allocation Repository the records concerning computers suitable for execution of the job to which a computer will be assigned for its execution. The computers suitable for job execution have the pre-requisite software environment of the job (operating system, patches, other necessary programs) as defined in the job definition provided by the scheduler to the Allocation Manager.

In the Allocation Repository the Allocation Manager will also select the records concerning the same job as the job for which a computer is to be found for its execution. The Allocation Manager can choose also the jobs which are similar jobs: that is, the same types of jobs. The type of a job can be given as an attribute of the job definition.

Once the first selection of computers and job records is made, the Allocation Manager reads the selected records of the Allocation Repository and particularly the statistical information on job executions and creates a table as shown in FIG. 9. In the table the computers are classified per increasing values of job duration time. For instance in the first row, computer Ct1 has submitted jSubm1 times the job since time zero with a duration time value over the Tr1 value. The same computer Ct1 has also submitted a certain number of times the job with a duration time value under the Tr2 value. Tr1 and Tr2 are configuration parameters of the Allocation Manager either given directly or computed by the Allocation Manager as explained later on in the document in relation to the description of FIG. 10. The number of jobs currently on execution for the computer are also computed from the records of the Allocation Repository and the last job duration is read from the Allocation Repository for each computer. The job duration time threshold values split the set of computers in the network suitable for the job into pools of computers having a duration time value for the job in one interval delimited by the threshold values. The Allocation Manager computes also in each pool of computers the number of current running jobs and stores this information to be used with the rest of the information in the table to choose the best computer for the job as explained in the flowchart of FIG. 10.

Figure 10:
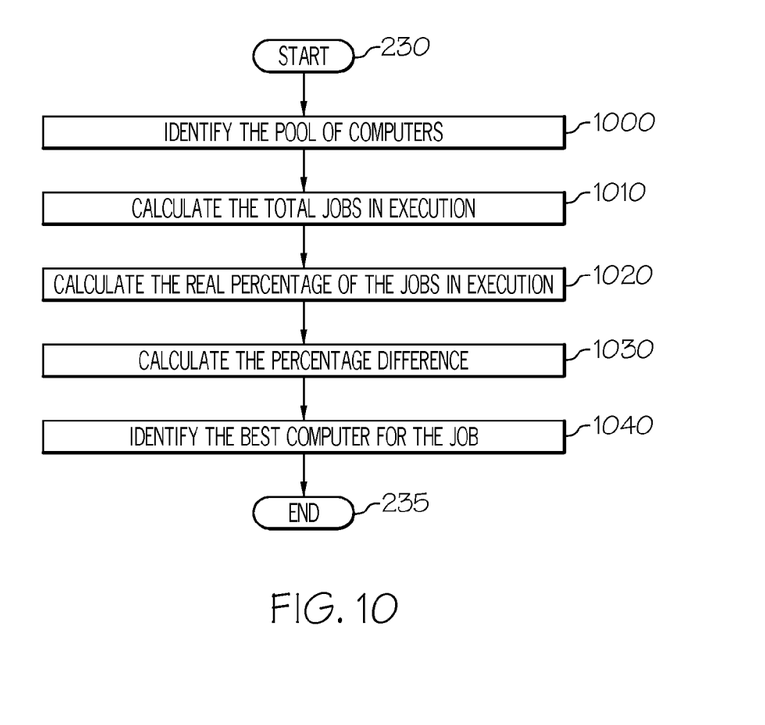
FIG. 10 is the detailed flowchart for evaluating the best computer of the flowchart of FIG. 2 according to one embodiment of the invention.

FIG. 10 depicts a flowchart for evaluating the best computer as described in block 230 of FIG. 2 according to one embodiment of the invention. The Allocation Manager is invoked by the scheduler to evaluate the best computer for execution of a given job, referenced as the JOB. Simultaneously, the scheduler provides as inputs to the Allocation Manager program the workflow definition for the JOB i.e. the JOB identifier and the pre-requisite for its execution. Optionally the scheduler provides also the job type (batch, interactive task, etc.,) as input to the Allocation Manager.

The Allocation Manager identifies the pool of computers by executing the following steps (block 1000):
Filtering of the Computers Suitable for Execution of the JOB:
 The Allocation Manager, by reading the Computer Repository, sees the pre-requisite capabilities for each computer and filters all the computers, selecting only the computers suitable to execute the JOB—that is, computers on which are operational the operating system and the programs which are pre-requisite for the JOB.
Similar Jobs:
 The Allocation Manager reads the historical data collected on execution of the same job or "similar" job (that is, a job of same type). If the same job has been already run, the Allocation Manager can compute information for all the instances of the same JOB or "similar jobs" read in all the statistical data.
 When a job is used for the first time, a "similar job" may be referred to: in one embodiment, one attribute can be added to the job definition handled by the job scheduler for classifying jobs according to some characteristics (e.g. "DB Transaction", "File movement", "Calculations", "Network Transfer"). In that case the Allocation Manager algorithm considers all instances of jobs belonging to the same category (even if there are different job definitions).
Computation of an Estimated Duration Time for the JOB:
 The Allocation Manager computes an estimated duration time which is a mean duration time for the JOB by computing an average of all the "last duration time" values of the JOB for each computer as recorded in the Allocation Repository. As the last duration time value is used, the mean duration time may change. Thus, the Allocation Manager algorithm adapts itself to the evolution of computer performance and workload changes. The Allocation Manager will detect automatically the changes in computer workload as last duration time values are updated, resulting in a change of the mean duration time.
Thresholds of Duration Time Value:
 The Allocation Manager may be directly given threshold parameter(s) or, in one embodiment, percentage(s) of the mean value may be used for threshold parameters(s). For instance, the Allocation Manager may receive as parameters two percentages: 10% and 120%. Thus, if the mean value is 18 seconds (mean duration time for the JOB on the computers as computed by the Allocation Repository), there will be two thresholds of 1.8 seconds and 21.6 seconds. In this case only 2 thresholds are used by the Allocation Manager; however any number of thresholds may be applied. Thus, at least one threshold and/or percentage is given as parameters to the Application Manager program.
 It is noted that the threshold which can be directly given as parameters can be chosen, for instance, as "standard deviation" in order to give equal splitting and avoid extreme values.
Building Pools of Computers:
 Continuing with the example above, the Allocation Manager, by continuing to read statistical data in the Allocation Repository, builds in memory the table as described in FIG. 9. The computed threshold Tr1 and Tr2 are set in the table. This allows delimiting three pools of computers (as taught in the example of FIG. 8-9) in which statistical occurrence of duration time for the JOB execution is respectively under 1.8 second, between 1.8 second and 21.6 second and over 21.6 second.

Choice of the Best Pool and the Best Computer in the Pool:

The Allocation Manager calculates the total of same JOB or similar job currently in execution in each pool of computers: S1, S2, ... Sn where n is the number of pools, three pools in the example of FIG. 9. These values are computed by reading in the Allocation Repository the jobs related to each computer of the pool for which the status is "currently running" and stored in the table of FIG. 9.

The Allocation Manager computes the total of all these jobs in execution (1010) in the system. Thus, in one example, Stot=S1+S2+S3. The Allocation Manager calculates the percentage of jobs in execution in each pool (1020):

In one example, $$P1 = \frac{S1}{Stot} \ldots Pn = \frac{Sn}{Stot}$$

For instance, there may be 70% of jobs executed on the fastest pool, 20% on the medium speed pool and 10% on the slowest pool. The Allocation Manager compares these percentages just computed to some ideal percentages parameters given as parameters to the Allocation Manager which represent the most efficient situation. For instance 80% on the fastest pool, 15% on the medium speed pool and 5% on the slowest pool.

The Allocation Manager will choose the pool of computers having the greatest difference (1030) between the ideal percentages and the calculated percentage of the same jobs or similar jobs currently in execution. That is to say, the best pool will be the pool that has not exceeded the ideal percentage of jobs currently in execution. It is noted that the pool chosen may be the pool having the slowest execution time, however, if the ideal ratio of jobs currently in execution has not been exceeded, this pool will have the potential to welcome execution of a new job.

In this chosen pool, the best computer that the Allocation Manager will choose (1040) is the computer in the pool which is currently running the lowest number of jobs (or similar jobs). If there are many computers running the same number of jobs, then the Allocation Manager chooses among them the one which has the lowest last job duration. This is because the computer having the fastest execution time for the job may have a reduction of its workload compared to the other computers and may be more efficient when executing that job.

It is noted that at time zero of statistics collection, if there is no job or similar job already executed in the Allocation Repository statistics, the system may allocate the JOB by selecting randomly a computer from the set of computers suitable for executing the JOB. A record for the first job execution on the computer is created in the Allocation Repository and will be used for the next execution of the same job on this computer. One other embodiment is to have, at time zero, a mean duration time given as parameter to the Allocation Manager program.

Figure 11:
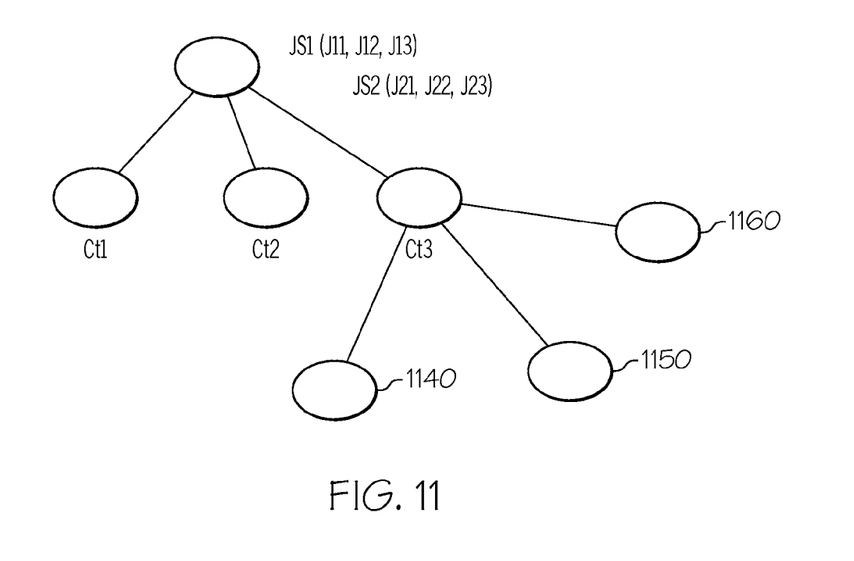
FIG. 11 illustrates the self-learning mechanism according to one embodiment of the invention.

FIG. 11 illustrates the self-learning mechanism according to one embodiment of the invention. With this new algorithm the system will explore several patterns identifying the computers where the workflow can be executed. Consider the case where JS1 is made of job11, job12, job13 having similar characteristics. JS1 is submitted on computers Ct1, Ct2 and Ct3. The duration time on Ct3 is shorter than the other two duration times on Ct1 and Ct2. This information is used by the system to drive the execution of the jobs contained in JS2.

Suppose that job22 is comparable to the jobs contained in JS1: in this case, the system will leverage the experience of JS1 and will execute job22 on Ct3. The algorithm is also able to dynamically detect changes in the execution time. This means that, once the optimal path has been calculated, the system keeps on checking for improved duration time on the other computers (1140, 1150, 1160) that have not been included in the optimal path.

The Allocation Manager will detect automatically as last duration time values are updated, resulting in a change of the mean duration time and will adapt the choice of computer accordingly. It is therefore an object of the present invention to provide a method for automatically dispatching jobs for execution on a network of computers in order to minimize job execution time on those computers.

As described herein, in one embodiment of the present disclosure is presented a method of scheduling a given job in a computer system comprising at least one computer, the method comprising selecting a target computer for execution of said job, said step of selecting a target computer comprising: retrieving historical records on past execution of said job on the computers of said computer system, for each computer in said computer system, computing the mean of last job duration values from said historical records on all computers having executed the job; selecting at least one pool of computers based on a condition related to said mean of last job duration values given as configuration parameter; computing the number of current executions ($S_i$) of said given job on each computer of said pools of computers and the ratio ($P_i$) for each pool of this number to the total of current job executions (Stot) in all the computers of all the pools of computers; selecting the group of pools of computers having the computed ratio which is the closest to an ideal ratio given as configuration parameter for each pool of computers; and, in said selected pool of computers, selecting the computer that has the smallest number of current executions of the job as the target computer.

In one embodiment, the said historical records comprise a job identifier, a computer identifier, the job duration for each job executed on each computer and, for each computer, the number of same jobs currently running and the last duration time of same jobs already executed.

In one embodiment, if more than one computer has the smallest number of current executions of the job, a processor chooses among them the computer having the smallest last job duration.

In one embodiment, the record containing information is updated on execution of the job on the target computer by incrementing by one the number of jobs currently running when the execution of job is started on the chosen computer, by replacing the last job duration of the target computer by the job duration obtained and by incrementing the number of jobs submitted on the target computer after execution of the job on the chosen computer.

In one embodiment, an initial step of first filtering among all the historical records of past execution of jobs is performed so that only the records for which the computer executing the job has the pre-requisite environment to execute the job are considered, said pre-requisite environment being given as input.

In one embodiment, the step of reading historical records on past execution of this job on computers includes reading records on past execution of a similar job on computers said similar job having the same pre-requisite and being the same type of job.

In one embodiment, a computer program product comprising programming code instructions for executing the steps of the method described above is presented.

In one embodiment, a system for scheduling a given job in a computer system comprising at least one computer is presented. The system comprises: a scheduler component reading the job pre-requisite and invoking an Allocation Manager component to choose a computer to execute the job; the Allocation Manager component being adapted to read historical data on past executions of the job on computers and computing the mean job duration time on these computers, applying percentage on the mean to define pools of computers according to areas of job duration time values and selecting the pool of computers having the greatest difference of percentage of use with an ideal percentage of use given as parameter to the Allocation Manager component and finally choosing the computer in the selected pool which has the smallest number of current executions of the job and dispatching the job for execution on this chosen computer.

In one embodiment, the system further comprises the Allocation Manager component comprising means for incrementing the number of jobs currently running on the chosen computer by one.

In one embodiment, the system further comprises: the Allocation Manager component comprising means for collecting job duration time from the chosen computer after execution of the job on the chosen computer; and, updating the historical record corresponding to execution of the job on the chosen computer by replacing the last duration time by the just collected duration time and incrementing by one the number of jobs submitted by on the chosen computer.

In one embodiment, the system further comprises means for randomly choosing a computer for execution of the job when no historical data exists on past executions of the job.

The present disclosure provides an automatic way to identify, at execution time, the best computers in a network of computers on which the jobs will be executed with the minimum execution time. The choice of the best computers for the jobs to schedule can guarantee the compliance with a given Service Level Agreement.

The present disclosure, in one embodiment, dynamically detects the changes in the execution time of a job on a computer. In this way the algorithm detects each time a job execution time has decreased on a computer which will be chosen for job execution because it becomes the computer where the job can be executed in the shortest amount of time.

The system described herein can, by self learning, automatically adapt to the change of the workload of the distributed computers to find the best computer for the job execution.

In one embodiment, the present disclosure presents a method, system and computer program product in which information used to find the best computer for a job execution is limited to the estimated job duration which is usually computed on statistical data collected by the schedulers and the real job duration data as collected after job execution completion. Further, there is no need to know the details of the resources of the computers, their physical characteristics, or the follow-on of their workload. Consequently, this obviates the need for monitoring on the computers the computing resources such as the CPU consumption, I/O etc. There is also no need to know much about the job content (the script commands, etc.).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method of selecting a target computer to execute a job, wherein the target computer is from a computer system comprising multiple computers, and wherein the computer implemented method comprises:

a processor retrieving historical records describing past executions of said job on the multiple computers of said computer system, the processor computing, for each computer in said computer system, a statistical mean of last job duration values from said historical records for all computers, in the computer system, that have executed the job, wherein the last job duration values describe a duration of time taken by each of said multiple computers to complete a most recent execution of said job;

the processor selecting multiple pools of computers, from said computer system, based on said statistical mean of last job duration values;

the processor computing a quantity of current executions of said job in each pool from said multiple pools of computers;

the processor computing a ratio for each pool from the multiple pools, wherein the ratio is a ratio of the quantity of current executions of said job in a specific pool relative to a total of current job executions of said job in all of the multiple pools of computers;

the processor selecting a particular pool of computers from the multiple pools, wherein the particular pool of computers has a computed ratio that is closest to a preselected ratio;

the processor selecting, from the selected particular pool of computers, a target computer, wherein the target computer has a smallest number of current executions of the job compared with other computers in the selected particular pool of computers; and the processor assigning a next iteration of the job to the target computer.

2. The computer implemented method of claim 1, wherein said historical records comprise:

a job identifier for the job, a computer identifier that identifies which computer from the computer system has executed the job, a job duration time for each said job executed on each computer from the computer system, and for each computer in the computer system, a quantity of same said jobs currently running and a latest duration time of the same said jobs that have already executed.

3. The computer implemented method of claim 2, further comprising:

in response to the processor determining that more than one computer has the smallest number of current executions of the job in progress, the processor choosing among said more than one computer a chosen computer, wherein the chosen computer has a smallest last job duration; and the processor updating the historical records containing information on execution of the job on the target computer by:

incrementing, by one, the quantity of current executions currently running in the selected particular pool of computers when execution of the job is started on the chosen computer;

replacing the latest duration time of the target computer with a current job duration time for the chosen computer; and incrementing the number of jobs submitted on the target computer after execution of the job on the chosen computer.

4. The computer implemented method of claim 3, further comprising:

the processor executing an initial step of first filtering, among all of the historical records of past execution of jobs, only records for which a particular computer executing the job has a requirement for a prerequisite environment to execute the job, wherein said prerequisite environment comprises:

a requisite operating system on which the job is to be executed, and requisite programs to be used for executing the job.

5. The computer implemented method of claim 4, further comprising:

the processor reading historical records of past execution of said job on the multiple computers in the computer system, wherein said historical records include records of past executions of a similar job as said job, wherein said similar job has a same said requirement for said prerequisite environment as said job, and wherein said similar job is of a same type as said job.

6. A computer program product for selecting a target computer to execute a job, wherein the target computer is from a computer system comprising multiple computers, and wherein the computer implemented method comprises:

a computer readable storage media;

first program instructions to retrieve historical records describing past executions of said job on the multiple computers of said computer system, second program instructions to compute, for each computer in said computer system, a statistical mean of last job duration values from said historical records for all computers, in the computer system, that have executed the job, wherein the last job duration values describe a duration of time taken by each of said multiple computers to complete a most recent execution of said job;

third program instructions to select multiple pools of computers, from said computer system, based on said statistical mean of last job duration values;

fourth program instructions to compute a quantity of current executions of said job in each pool from said multiple pools of computers;

fifth program instructions to compute a ratio for each pool from the multiple pools, wherein the ratio is a ratio of the quantity of current executions of said job in a specific pool relative to a total of current job executions of said job in all of the multiple pools of computers;

sixth program instructions to select a particular pool of computers from the multiple pools, wherein the particular pool of computers has a computed ratio that is closest to a preselected ratio;

seventh program instructions to select, from the selected particular pool of computers, a target computer, wherein the target computer has a smallest number of current executions of the job compared with other computers in the selected particular pool of computers; and eighth program instructions to assign a next iteration of the job to the target computer; and wherein the first, second, third, fourth, fifth, sixth, seventh, and eighth program instructions are stored on the computer readable storage media.

7. The computer program product of claim 6, wherein said historical records comprise:

a job identifier for the job, a computer identifier that identifies which computer from the computer system has executed the job, a job duration time for each said job executed on each computer from the computer system, and for each computer in the computer system, a quantity of same said jobs currently running and a latest duration time of the same said jobs that have already executed.

8. The computer program product of claim 7, further comprising:

ninth program instructions to, in response to the processor determining that more than one computer has the smallest number of current executions of the job in progress, choose among said more than one computer a chosen computer, wherein the chosen computer has a smallest last job duration; and tenth program instructions to update the historical records containing information on execution of the job on the target computer by:

incrementing, by one, the quantity of current executions currently running in the selected particular pool of computers when execution of the job is started on the chosen computer;

replacing the latest duration time of the target computer with a current job duration time for the chosen computer; and incrementing the number of jobs submitted on the target computer after execution of the job on the chosen computer; and wherein the ninth and tenth program instructions are stored on the computer readable storage media.

9. The computer program product of claim 8, further comprising:

eleventh program instructions to execute an initial step of first filtering, among all of the historical records of past execution of jobs, only records for which a particular computer executing the job has a requirement for a prerequisite environment to execute the job, wherein said prerequisite environment comprises:

a requisite operating system on which the job is to be executed, and requisite programs to be used for executing the job; and wherein the eleventh program instructions are stored on the computer readable storage media.

10. The computer program product of claim 9, further comprising:

twelfth program instructions to read historical records of past execution of said job on the multiple computers in the computer system, wherein said historical records include records of past executions of a similar job as said job, wherein said similar job has a same said requirement for said prerequisite environment as said job, and wherein said similar job is of a same type as said job; and wherein the twelfth program instructions are stored on the computer readable storage media.

11. A computer system comprising:

a processor, a computer readable memory, and a computer readable storage media;

first program instructions to retrieve historical records describing past executions of a job on a multiple computers of a computer system, second program instructions to compute, for each computer in said computer system, a statistical mean of last job duration values from said historical records for all computers, in the computer system, that have executed the job, wherein the last job duration values describe a duration of time taken by each of said multiple computers to complete a most recent execution of said job;

third program instructions to select multiple pools of computers, from said computer system, based on said statistical mean of last job duration values;

fourth program instructions to compute a quantity of current executions of said job in each pool from said multiple pools of computers;

fifth program instructions to compute a ratio for each pool from the multiple pools, wherein the ratio is a ratio of the quantity of current executions of said job in a specific pool relative to a total of current job executions of said job in all of the multiple pools of computers;

sixth program instructions to select a particular pool of computers from the multiple pools, wherein the particular pool of computers has a computed ratio that is closest to a preselected ratio;

seventh program instructions to select, from the selected particular pool of computers, a target computer, wherein the target computer has a smallest number of current executions of the job compared with other computers in the selected particular pool of computers; and eighth program instructions to assign a next iteration of the job to the target computer; and wherein the first, second, third, fourth, fifth, sixth, seventh, and eighth program instructions are stored on the computer readable storage media for execution by said processor via said computer readable memory.

12. The computer system of claim 11, wherein said historical records comprise:

a job identifier for the job, a computer identifier that identifies which computer from the computer system has executed the job, a job duration time for each said job executed on each computer from the computer system, and for each computer in the computer system, a quantity of same said jobs currently running and a latest duration time of the same said jobs that have already executed.

13. The computer system of claim 12, further comprising:

ninth program instructions to, in response to the processor determining that more than one computer has the smallest number of current executions of the job in progress, choose among said more than one computer a chosen computer, wherein the chosen computer has a smallest last job duration; and tenth program instructions to update the historical records containing information on execution of the job on the target computer by:

incrementing, by one, the quantity of current executions currently running in the selected particular pool of computers when execution of the job is started on the chosen computer;

replacing the latest duration time of the target computer with a current job duration time for the chosen computer; and incrementing the number of jobs submitted on the target computer after execution of the job on the chosen computer; and wherein the ninth and tenth program instructions are stored on the computer readable storage media for execution by said processor via said computer readable memory.

14. The computer system of claim 13, further comprising:

eleventh program instructions to execute an initial step of first filtering, among all of the historical records of past execution of jobs, only records for which a particular computer executing the job has a requirement for a prerequisite environment to execute the job, wherein said prerequisite environment comprises:

a requisite operating system on which the job is to be executed, and requisite programs to be used for executing the job; and wherein the eleventh program instructions are stored on the computer readable storage media for execution by said processor via said computer readable memory.

15. The computer system of claim 14, further comprising:

twelfth program instructions to read historical records of past execution of said job on the multiple computers in the computer system, wherein said historical records include records of past executions of a similar job as said job, wherein said similar job has a same said requirement for said prerequisite environment as said job, and wherein said similar job is of a same type as said job; and wherein the twelfth program instructions are stored on the computer readable storage media for execution by said processor via said computer readable memory.

* * * * *